3,287,105
DERIVATIVES OF PYRIDAZONE
Franz Reicheneder, Ludwigshafen (Rhine), Germany, and Karl Dury, deceased, late of Kirchheimbolanden, Germany, by Johanna Maria Dury, heiress-at-law, Kirchheimbolanden, Germany, and Adolf Fischer, Mutterstadt, Pfalz, Germany, assignors to Badische Anilin- & Soda-Fabrik Aktiengesellschaft, Ludwigshafen (Rhine), Germany
No Drawing. Filed Jan. 26, 1966, Ser. No. 523,232
Claims priority, application Germany, Feb. 5, 1965, B 80,383
6 Claims. (Cl. 71—2.5)

The present invention relates to new pyridazone derivatives. It also relates to a method of controlling unwanted plant growth with these pyridazone derivatives.

It is an object of this invention to provide new and valuable pyridazone derivatives. Another object of the invention is the provision of a method for controlling undesired plant growth, for example among crop plants, with the pyridazone derivatives without damaging the crop plants.

It is known that 1-phenyl-4-α-hydroxy-β,β,β-trichloroethylamino-5-chloropyridazone-(6) may be used as an active substance for herbicides (British patent specification No. 929,457). Its action is, however, unsatisfactory.

We have now found that pyridazone derivatives having the formula

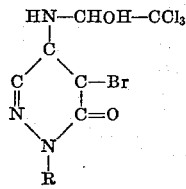

(in which R denotes a phenyl radical or a cycloaliphatic radical having six to eight carbon atoms) have a good herbicidal action. Its effect is both selective and total, and it is used in pre-emergence and post-emergence methods. The active substances are suitable for destroying weeds among crop plants and for the complete destruction of plant growth for example at the edges of roads and on waste land.

Pyridazone derivatives to be used in accordance with this invention may be prepared by conventional methods, for example by reaction of 1-phenyl-4-amino-5-bromopyridazone-(6) with chloral, advantageously in a solvent, for example dimethylformamide.

The following may be given as examples of active substances: 1-phenyl-4-α-hydroxy-β,β,β-trichloroethylamino-5-bromopyridazone-(6): melting point 213° to 215° C., with decomposition; 1 - cyclohexyl-4-α-hydroxy-β,β,β-trichloroethylamino-5-bromopyridazone-(6): melting point 215° to 220° C., with decomposition.

The plant growth regulants according to this invention may be applied as solutions, emulsions, suspensions or dusts. The form in which they are applied depends entirely on the purpose for which they are to be used and should in all cases ensure a fine distribution of the active substance. The effect, particularly when using the regulants as total herbicides, in premature drying out and in defoliation, may be further enhanced by the use of carrier substances which are themselves phytotoxic, such as high boiling point mineral oil fractions or chlorohydrocarbons.

On the other hand selectivity with regard to growth inhibition is sometimes more evident when using carrier substances which are inert to plants, for example in selective weedkilling in the cultivation of onions or crop plants.

Mineral oil fractions having medium to high boiling points, for example kerosene or diesel oil, and also coal tar oils and vegetable and animal oils, cyclic hydrocarbons, for example tetrahydronaphthalene and alkylated naphthalenes, are suitable for the production of solutions capable of being directly sprayed, these being added to the active substances according to this invention, with or without the use of auxiliary solvents, for example xylene. Solutions in low boiling point solvents, such as alcohols, for example ethanol, isopropanol and methylcyclohexanol; ketones, as for example acetone and cyclohexanone; ethers, as for example tetrahydrofurane and dioxane; hydrocarbons, for example benzene, toluene, and xylene; and also in chlorinated hydrocarbons, such as chloroform, carbon tetrachloride, tetrachloroethane, ethylene chloride or trichloroethylene, are less suitable for direct application than for combination with suitable emulsifiers for the purpose of preparing concentrates for the preparation of aqueous emulsions:

Aqueous formulations may be prepared from emulsion concentrates, pastes or wettable powders (sprayable powders) by adding water. For the preparation of the emulsions, the substances, as such or dissolved in one of the above-mentioned solvents, may be homogenized in water by means of mixing agents or dispersing agents. The emulsifying and dispersing agents may be both cation-active emulsifying agents, such as quaternary ammonium compounds, and anion-active emulsifying agents, such as soaps, soft soaps, aliphatic long chain sulfuric acid monoesters, and also aliphatic-aromatic sulfonic acids, lignin sulfonic acids, long chain alkoxyacetic acids, but may also be nonionic emulsifying agents, for example polyethylene ethers of fatty alcohols and polyethylene oxide condensation products. Concentrates may also be prepared from active substance, emulsifying or dispersing agent and if desired solvent, these concentrates being suitable for dilution with water. Compounds which have adequate basicity may be formed into salts with acids and used as aqueous solutions of salts.

Dusts may be prepared by mixing or common grinding of the active substance with a solid carrier material. Examples of carrier substances are: talc, diatomaceous earth, kaolin, bentonite, calcium carbonate, boric acid, calcium phosphate, but also wood flour, cork dust, carbon and other materials. Scatterable granulates may be obtained for example by using ammonium sulfate as the carrier material. Alternatively carrier materials may be impregnated with solutions of the active substances in liquid solvents. Powder preparations or pastes which can be suspended in water and used as sprays may be obtained by adding wetting agents and protective colloids.

The various forms of application may be better adapted to the various purposes for which the active substances are to be used by conventional methods by the addition of substances which improve dispersion, adhesion, resistance to rain and penetrative power, such as fatty acids, resins, wetting agents, emulsifying agents, glue or alginates. Similarly the biological action spectrum may be broadened by adding substances having bactericidal, fungicidal, and plant growth regulating properties, and also by combination with fertilizers.

The following examples will illustrate the effect of the herbicides according to this invention.

*Example 1*

Indian corn (*Zea mays*), barley (*Hordeum vulgare*), wheat (*Triticum vulgare*), beet (*Beta vulgaris*), onions (*Alium cepa*), peas (*Pisum sativum*), wild mustard (*Sinapis arvensis*), white goosefoot (*Chenopodium album*), camomile (*Matricaria chamomilla*), sorrel (*Rumex sp.*), annual meadow grass (*Poa annua*), orchard grass (*Dactylis glomerata*) and slender foxtail (*Alopecurus myosuroides*) are shown in a greenhouse in plastic pots having a diameter of 8 cm. and filled with loamy sandy soil and then 1-phenyl-4-(α-hydroxy-β,β,β-trichloroethyl)-amino-5-bromopyridazone- (6) (I), 1 - cyclohexyl-4-(α-hydroxy-β,β,β - trichloroethyl)-amino-5-bromopyridazone-(6) (II) and, for comparison, 1-phenyl-4-(α-hydroxy-β,β,β-trichloroethyl)-amino-5-chloropyridazone-(6) (III) are sprayed onto the surface of the soil in the plastic pots at a rate of application of 2 kg. of active substance per hectare dispersed in 500 liters of water per hectare. Four weeks later, the following results are observed

|  | Active substance | | |
| --- | --- | --- | --- |
|  | I | II | III |
| Indian corn | 0–10 | 0–10 | 0–10 |
| Barley | 0–10 | 0–10 | 0–10 |
| Wheat | 10–20 | 10–20 | 20 |
| Beet | 0 | 0 | 0–10 |
| Onions | 10 | 10 | 10 |
| Peas | 0 | 0 | 0 |
| Wild mustard | 100 | 100 | 90 |
| White goosefoot | 100 | 100 | 90 |
| Camomile | 100 | 100 | 90 |
| Sorrel | 90–100 | 100 | 80–90 |
| Annual meadow grass | 100 | 100 | 80 |
| Orchard grass | 90–100 | 100 | 70–80 |
| Slender foxtail | 80 | 80–90 | 40–50 |

0=no damage, 100=total destruction.

*Example 2*

The plants Indian corn (*Zea mays*), barley (*Hordeum vulgare*), wheat (*Triticum vulgare*), onions (*Alium cepa*), peas (*Pisum sativum*), wild mustard (*Sinapis arvensis*), white goosefoot (*Chenopodium album*), amaranth pigweed (*Amaranthus retroflexus*), camomile (*Matricaria chamomilla*), sorrel (*Rumex sp.*), annual meadow grass (*Poa annua*), orchard grass (*Dactylis glomerata*), and slender foxtail (*Alopecurus myosuroides*) are sprayed at a growth height of 5 to 18 cm. with compounds I, II and III used in Example 1, the rate of application being in each case 2 kg. of active substance per hectare dispersed in 500 liters of water per hectare. Some days later it is observed that action sets in much more rapidly in the case of I and II as compared with III and after three weeks almost all of the weeds and weed grasses have withered. The results of the experiment may be seen in the following table:

|  | Active substance | | |
| --- | --- | --- | --- |
|  | I | II | III |
| Indian corn | 0–10 | 0 | 0–10 |
| Barley | 0 | 0–10 | 10 |
| Wheat | 10–20 | 20 | 20–30 |
| Onions | 10–20 | 30 | 20–30 |
| Peas | 0 | 0 | 0 |
| Wild mustard | 100 | 100 | 90 |
| White goosefoot | 100 | 100 | 90 |
| Amaranth pigweed | 90–100 | 100 | 70–80 |
| Camomile | 100 | 100 | 90 |
| Sorrel | 90–100 | 100 | 70–80 |
| Annual meadow grass | 100 | 100 | 50–60 |
| Orchard grass | 80–90 | 90–100 | 40 |
| Slender foxtail | 90–100 | 90–100 | 50 |

0=no damage, 100=total destruction.

*Example 3*

An agricultural cultivated area which has been sown with dicotyledonous weeds and weed grasses, for example wild mustard (*Sinapis arvensis*), white goosefoot (*Chenopodium album*), small nettle (*Urtica urens*), gallant soldier (*Galinsoga parviflora*), cleavers (*Galium aparine*), knotweed (*Polygonum sp.*), chickweed (*Stellaria media*), annual meadow grass (*Poa annua*), orchard grass (*Dactylis glomerata*) and slender foxtail (*Alopecurus myosuroides*) is sprayed on the day of sowing with compounds I and II used in Example 1 and, for comparison, with 2-chloro-4,6-bis - (ethylamino) - s-triazine (IV) in each case at the rate of application of 5 kg. of active substance per hectare dispersed in 500 liters of water per hectare. Some time later it is observed that the compounds I and II prevent germination of the weeds and weed and grasses from the start, while on the test area treated with the compound IV the plants germinate. Three to four weeks later, all the weeds and weed grasses have completely withered. 1-cyclooctyl-4-(α - hydroxy-β,β,β-trichloroethyl)-amino-5-bromopyridazone-(6) (V) has the same biological activity as the compound I in Examples 3 and 4.

*Example 4*

Compounds I and II and, for comparison, compound IV are sprayed at the rate of 5 kg. of active substance per hectare dispersed in 500 liters of water per hectare to a weed-infested cultivated area which is overgrown with wild mustard (*Sinapis arvensis*), white goosefoot (*Chenopodium album*), small nettle (*Urtica urens*), gallant soldier (*Galinsoga parviflora*), cleavers (*Galium aparine*), knotweed (*Polygonum sp.*), chickweed (*Stellaria media*), annual meadow grass (*Poa annua*), orchard grass (*Dactylis glomerata*) and slender foxtail (*Alopecurus myosuroides*) at a growth height of 4 to 9 cm. Some days later it is observed that the weeds and weed grasses treated with I and II are much more seriously damaged than those treated with IV. After a test period of three weeks, the plants treated with compounds I, II and IV are completely withered.

*Example 5*

In a greenhouse plastics pots having a diameter of 8 cm. are filled with loamy sandy soil, and seeds of *Zea mays* (Indian corn), *Hordeum vulgare* (barley), *Triticum vulgare* (wheat), *Beta vulgaris* (beet), *Pisum sativum* (peas), *Gossypium sp.* (cotton), *Solanum tuberosum* (potatoes), *Sinapis arvensis* (wild mustard), *Chenopodium album* (white goosefoot) *Matricaria chamomilla* (camomile), *Stellaria media* (chickweed), *Poa annua* (annual meadow grass), *Alopecurus myosuroides* (slender foxtail) are sown therein. The soil thus prepared is then treated with 2 kg. per hectare of compound V and, for comparison, with 2 kg. per hectare of compound III, each dispersed in 500 liters of water per hectare. Four to five weeks later it can be observed that there is a stronger herbicidal effect with compound V than with compound III. The herbicidal effect may be seen from the following table:

|  | Active substance | |
| --- | --- | --- |
|  | V | III |
| Crop plants: | | |
| Indian corn | 0 | 0–10 |
| Barley | 0–10 | 0–10 |
| Wheat | 10 | 20 |
| Beet | 0–10 | 0–10 |
| Peas | 0–10 | 0 |
| Cotton | 0 | 10–20 |
| Potatoes | 0 | 10 |
| Unwanted plants: | | |
| Wild mustard | 100 | 80–90 |
| White goosefoot | 90–100 | 90 |
| Camomile | 80–90 | 80–90 |
| Chickweed | 90–100 | 70–80 |
| Annual meadow grass | 90–100 | 80 |
| Slender foxtail | 80 | 40–50 |

0=no damage; 100=total destruction.

*Example 6*

The plants *Zea mays* (Indian corn), *Hordeum vulgare* (barley), *Triticum vulgare* (wheat), *Pisum sativum*

(peas), *Gossypium sp.* (cotton), *Sinapis arvensis* (wild mustard), *Chenopodium album* (white goosefoot), *Amarantus retroflexus* (amaranth pigweed), *Matricaria chamomilla* (camomile), *Stellaria media* (chickweed), *Poa annua* (annual meadow grass), *Alopecurus myosuroides* (slender foxtail) are treated in a greenhouse at a growth height of 3 to 15 cm. with 2 kg. per hectare of compound V and, for comparison, with 2 kg. per hectare of compound III, dispersed in each case in 500 liters of water per hectare. Three to four weeks later it is observed that there is a stronger action with compound V than with compound III. The herbicidal action may be seen from the following table:

|  | Active substance | |
| --- | --- | --- |
|  | V | III |
| Crop plants: |  |  |
| Indian corn | 0 | 0–10 |
| Barley | 10 | 10 |
| Wheat | 10 | 20–30 |
| Peas | 0 | 0 |
| Cotton | 0 | 15–20 |
| Unwanted plants: |  |  |
| Wild mustard | 100 | 90 |
| White goosefoot | 90–100 | 90 |
| Amaranth pigweed | 90 | 70–80 |
| Camomile | 90–100 | 90 |
| Chickweed | 80 | 40–50 |
| Annual meadow grass | 80 | 50–60 |
| Slender foxtail | 70–80 | 50 |

0=no damage; 100=total destruction.

We claim:
1. A pyridazone derivative having the formula

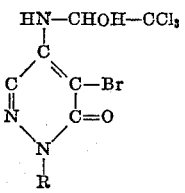

in which R denotes a member selected from the group consisting of phenyl and cycloalkyl having six to eight carbon atoms.

2. 1-phenyl-4-(α-hydroxy-β,β,β - trichloroethyl)-amino-5-bromopyridazone-(6).

3. 1-cyclohexyl-4-(α-hydroxy - β,β,β - trichloroethyl)-amino-5-bromopyridazone-(6).

4. 1-cyclooctyl-4-(α-hydroxy - β,β,β - trichloroethyl)-amino-5-bromopyridazone-(6).

5. A method for controlling unwanted vegetation which comprises treating the vegetation with a phytotoxic amount of a pyridazone derivative as claimed in claim 1.

6. A method for controlling unwanted vegetation which comprises treating the soil with a phytotoxic amount of pyridazone derivative as claimed in claim 1.

No references cited.

NICHOLAS S. RIZZO, *Primary Examiner.*